(12) United States Patent
Bodie et al.

(10) Patent No.: US 6,691,990 B2
(45) Date of Patent: Feb. 17, 2004

(54) VARIABLE ORIFICE TRACK POWERTRAIN MOUNT

(75) Inventors: Mark O. Bodie, Dayton, OH (US); Mark W. Long, Bellbrook, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/997,746

(22) Filed: Nov. 29, 2001

(65) Prior Publication Data

US 2003/0098535 A1 May 29, 2003

(51) Int. Cl.[7] .................................................. F16M 9/00
(52) U.S. Cl. .................................................. 267/140.14
(58) Field of Search ....................... 267/140.11, 140.13, 267/140.14, 140.15, 140.2

(56) References Cited

U.S. PATENT DOCUMENTS

| | | | | |
|---|---|---|---|---|
| 4,681,306 A | * | 7/1987 | Hofmann et al. | 267/140.13 |
| 4,699,099 A | * | 10/1987 | Arai et al. | 123/192.1 |
| 4,834,349 A | * | 5/1989 | Arai et al. | 267/140.14 |
| 4,836,512 A | * | 6/1989 | Lun | 267/140.13 |
| 4,869,478 A | * | 9/1989 | Bouhours et al. | 267/140.13 |
| 4,877,225 A | * | 10/1989 | Noguchi et al. | 267/140.14 |
| 4,969,632 A | * | 11/1990 | Hodgson et al. | 267/140.11 |
| 5,197,692 A | * | 3/1993 | Jones et al. | 244/54 |
| 5,246,213 A | | 9/1993 | Zup et al. | |
| 5,263,693 A | | 11/1993 | Klein | |
| 5,273,262 A | | 12/1993 | Baldini et al. | |
| 5,404,528 A | | 4/1995 | Mahajan | |
| 5,779,231 A | * | 7/1998 | Okazaki et al. | 267/140.14 |
| 5,964,832 A | | 10/1999 | Kisor | |

* cited by examiner

Primary Examiner—Jack Lavinder
Assistant Examiner—Xuan Lan Nguyen
(74) Attorney, Agent, or Firm—Scott A. McBain

(57) ABSTRACT

A powertrain mount comprises an orifice plate and a track member. The orifice plate has an exit, a first surface sloping toward the exit, and an inner surface. The track member has an outer surface proximate the first surface of the orifice plate, and the outer surface of the track member has an entrance. A containment plate forms an orifice track with the first and inner surfaces of the orifice plate and with the outer surface of the track member.

20 Claims, 2 Drawing Sheets

VARIABLE ORIFICE TRACK POWERTRAIN MOUNT

TECHNICAL FIELD OF THE INVENTION

The present invention relates to powertrain mounts for motor vehicles, and more particularly to a powertrain mount having a variable orifice track.

BACKGROUND OF THE INVENTION

It is desirable to provide motor vehicles with improved operating smoothness by damping and/or isolating powertrain vibrations of the vehicle. A variety of mount assemblies are presently available to inhibit such engine and transmission vibrations. Hydraulic mount assemblies of this type typically include a reinforced, hollow rubber body that is closed by a resilient diaphragm so as to form a cavity. This cavity is separated into two chambers by a plate. A first or primary chamber is formed between the partition plate and the body, and a secondary chamber is formed between the plate and the diaphragm.

The chambers may be in fluid communication through a relatively large central passage in the plate, and a decoupler may be positioned in the central passage of the plate to reciprocate in response to the vibrations. The decoupler movement alone accommodates small volume changes in the two chambers. When, for example, the decoupler moves in a direction toward the diaphragm, the volume of the portion of the decoupler cavity in the primary chamber increases and the volume of the portion in the secondary chamber correspondingly decreases, and vice-versa. In this way, for certain small vibratory amplitudes and generally higher frequencies, fluid flow between the chambers is substantially avoided and undesirable hydraulic damping is eliminated. In effect, the decoupler is a passive tuning device.

As an alternative or in addition to the relatively large central passage, an orifice track is normally provided. The orifice track has a relatively small, restricted flow passage extending around the perimeter of the orifice plate. Each end of the track has an opening, with one opening communicating with the primary chamber and the other with the secondary chamber. The orifice track provides the hydraulic mount assembly with another passive tuning component, and when combined with the decoupler, provides at least three distinct dynamic operating modes. The particular operating mode is primarily determined by the flow of fluid between the two chambers.

More specifically, small amplitude vibrating input, such as from relatively smooth engine idling or the like, produces no damping due to the action of the decoupler, as explained above. In contrast, large amplitude vibrating inputs, such as large suspension inputs, produce high velocity fluid flow through the orifice track, and an accordingly high level of damping force and desirable control and smoothing action. A third or intermediate operational mode of the mount occurs during medium amplitude inputs experienced in normal driving and resulting in lower velocity fluid flow through the orifice track. In response to the decoupler switching from movement in one direction to another in each of the modes, a limited amount of fluid can bypass the orifice track by moving around the edges of the decoupler, smoothing the transition.

SUMMARY OF THE INVENTION

The present invention is a powertrain mount comprising an orifice plate and a track member. The orifice plate has an exit, a first surface sloping toward the exit, and an inner surface. The track member has an outer surface proximate the first surface of the orifice plate, and the outer surface of the track member has an entrance. A containment plate forms an orifice track with the first and inner surfaces of the orifice plate and with the outer surface of the track member.

Accordingly, it is an object of the present invention to provide an improved powertrain mount of the type described above that reduces the dynamic stiffness of the mount at a disturbance frequency.

Another object of the present invention is to provide an improved powertrain mount of the type described above in which the orifice track length and area are variable.

Still another object of the present invention is to provide an improved powertrain mount of the type described above in which the orifice track length and cross-sectional area change as a function of the disturbance frequency.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
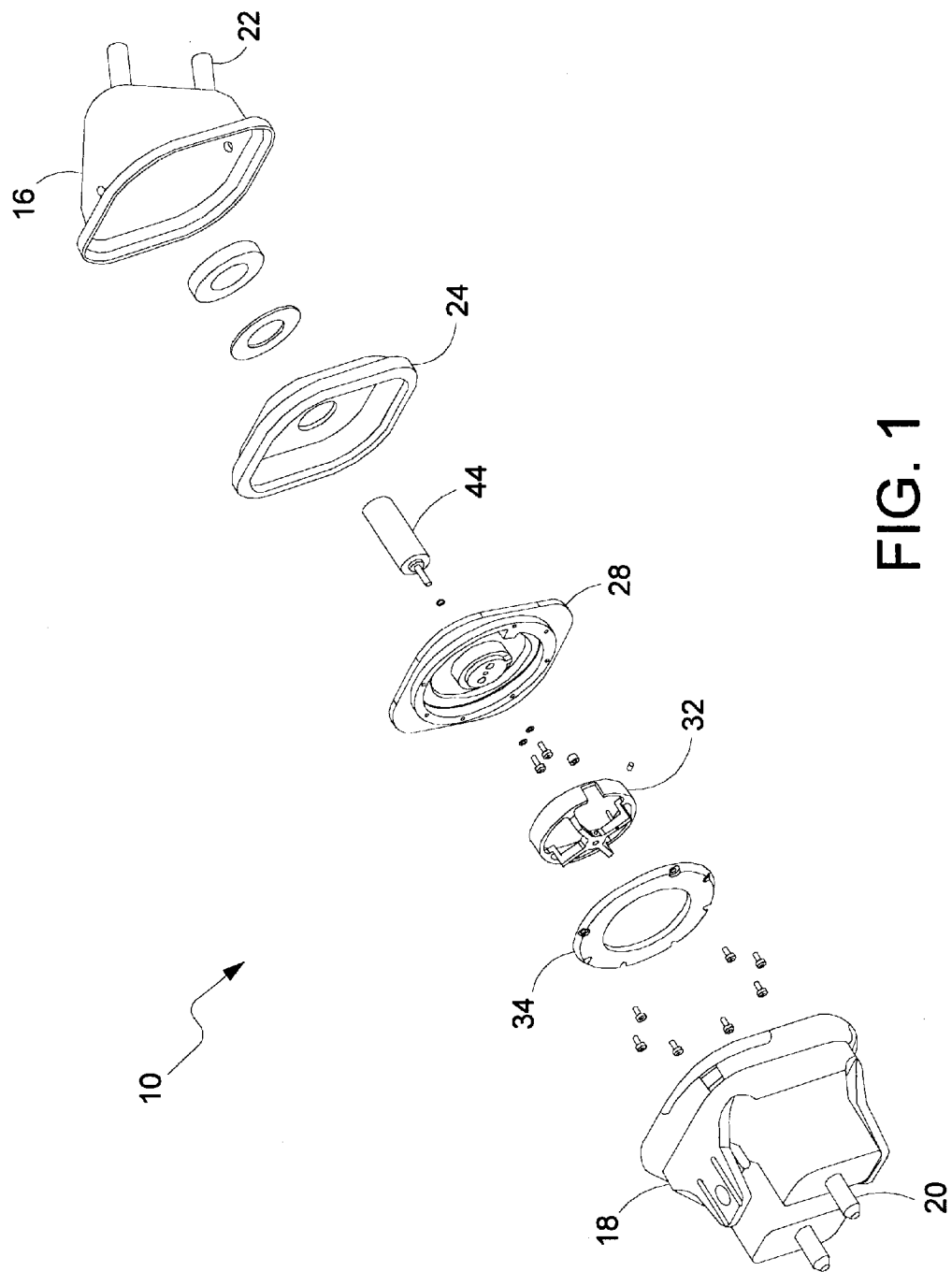
FIG. 1 is an exploded perspective view of a powertrain mount according to the present invention for a motor vehicle.

FIG. 1 shows an improved hydraulic mount assembly 10 according to the present invention. The mount assembly 10 is particularly adapted for mounting an internal combustion engine and/or transmission to a frame in a motor vehicle. The mount assembly 10 includes a metal base plate 16 and a molded body 18. The molded body 18 has an elastomeric portion molded around a metal substrate, and includes a plurality of studs 20 projecting outwardly to attach the molded body to the engine or transmission. The base plate 16 is similarly equipped with a plurality of outwardly projecting studs 22 to attach the base plate to the frame.

The base plate 16 and the molded body 18 are configured to be joined to form a hollow cavity for receiving a damping liquid such as a glycol fluid. An elastomeric diaphragm 24 of natural or synthetic rubber is attached around its perimeter to the base plate 16 and/or to the body 18, and extends across the cavity. The diaphragm 24 may include an annular rim section having a radially inwardly facing internal groove formed between upper and lower shoulders such as is described in U.S. Pat. No. 5,263,693, the disclosure of which is hereby incorporated by reference. The shoulders are normally flexible so as to sealingly receive the periphery of a die-cast metal or plastic partition plate 28.

Figure 2:
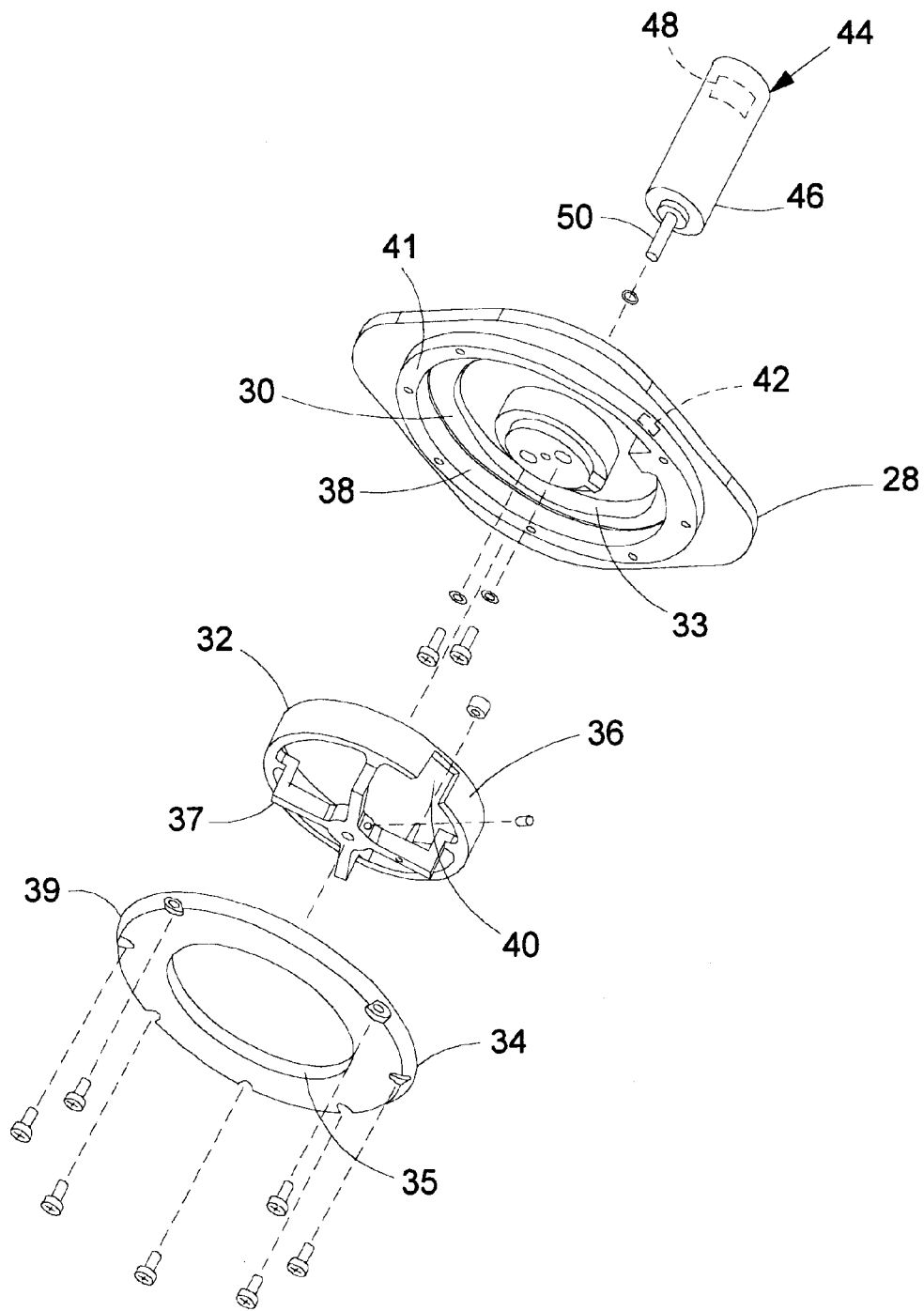
FIG. 2 is an exploded perspective view of a portion of the powertrain mount.

The partition plate 28 spans the cavity to define a primary chamber and a secondary chamber, as is well known. The partition plate 28 includes a spiraling surface 30, best seen in FIG. 2, and a circular wall 33 that is preferably situated generally perpendicularly to the surface 30. A circular track member 32 is held against the orifice plate 28 and in close proximity to the wall 33 by a containment plate 34. An inside diameter 35 of the containment plate 34 is sized to be closely received over legs 37 of the track member, while an outside diameter 39 of the containment plate is fastened to a raised rim 41 of the partition plate.

An orifice track is thus defined by a generally circular outer surface 36 of the track member opposed to a generally circular or tapering inner surface 38 of the orifice plate, and the surface 30 opposed to the containment plate. The orifice track permits the flow of fluid between the primary and secondary chambers. To this end, an entrance 40 is provided in the track member 32, and an exit 42 is provided in the orifice plate 28. Because the surface 30 slopes downwardly toward the exit 42, and because the inner surface 38 may widen as it approaches the exit of the orifice plate, the cross-sectional area of the orifice track changes throughout its length and is a maximum at the exit.

A motor assembly 44 is provided including an electric motor 46 and an encoder 48. The motor 46 includes a shaft 50 that extends through the containment plate 28 and engages the track member 32. The encoder 48 measures the angular position of the track member 32, and communicates that information to a controller. The controller also receives an engine rpm signal from a powertrain controller, and determines the vibration disturbance frequency. The controller then determines the desired angle of rotation of the track member 32 to reduce the dynamic stiffness associated with the mount 10 at the disturbance frequency. The controller minimizes the difference between the desired angle of rotation and the angle measured from the encoder 48 by applying a voltage to the motor 46.

The dynamic stiffness of the mount is reduced by the fluid flow in the orifice track being out of phase with the input flow. The input flow is caused by the vibration disturbance deflecting the molded body 18. The deflection of the molded body 18 results in a change in the volume of the primary chamber, which results in fluid pumping into the primary chamber. When the fluid flow in the orifice track is out of phase with the input flow, the fluid flow can travel through the orifice track. As the frequency of the flow in the orifice track becomes close to the track resonance, the magnitude of the track flow becomes greater. The orifice track flow enters the secondary chamber, which results in a pressure difference between the primary and secondary chambers. The pressure difference between the two chambers generates a force that reduces the dynamic stiffness of the mount. Therefore, the maximum reduction in the dynamic stiffness of the mount occurs at the beginning of the orifice track resonance, when the orifice track flow is large and the input and orifice track flows are out of phase.

In order to use the fluid resonance of the orifice track to reduce the dynamic stiffness of the mount, the track must be tuned for the disturbance frequency. In general, the natural frequency of the track is lowered by increasing the inertia of the fluid in the orifice track. This is accomplished by rotating the track member 32 to lengthen the orifice track and/or reduce its cross-sectional area. Conversely, the shorter the orifice track and the larger the cross-sectional area of the orifice track, the smaller the fluid inertia and the higher the natural frequency. When the track resonance frequency is tuned to the disturbance frequency, the isolation function of the mount is improved.

The variable length and effective cross-sectional area of the orifice track allows the powertrain mount 10 to optimally perform the two main functions of the powertrain, namely isolation and engine control. During engine idle, the length and area of the orifice track is changed as a function of engine rpm. In the control mode, the length and area of the orifice track is changed such that maximum damping is achieved at the engine bounce frequency.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are embraced therein.

What is claimed is:

1. A powertrain mount comprising:
   an orifice plate having an exit, a first surface sloping toward the exit, and an inner surface;
   a track member having an outer surface proximate the first surface of the orifice plate, the outer surface of the track member having an entrance; and
   a containment plate forming an orifice track with the first and inner surfaces of the orifice plate and with the outer surface of the track member, wherein a cross-sectional area of the orifice track changes throughout a length of the orifice track.

2. The powertrain mount of claim 1 further comprising a motor engaged with the track member and adapted to rotate the track member.

3. The powertrain mount of claim 1 further comprising an encoder and a motor, the motor being engaged with the track member and adapted to rotate the track member.

4. The powertrain mount of claim 1 wherein the outer surface of the track member is generally circular.

5. The powertrain mount of claim 1 wherein the containment plate retains the track member against the orifice plate.

6. A mount for a powertrain component, the mount comprising:
   a base plate;
   a molded member connected to the base plate;
   an orifice plate connected to one of the base plate or the molded member, the orifice plate having an exit, a first surface sloping toward the exit, and an inner surface;
   a track member having an outer surface proximate the first surface of the orifice plate, the outer surface of the track member having an entrance; and
   a containment plate forming an orifice track with the first and inner surfaces of the orifice plate and with the outer surface of the track member, wherein a cross-sectional area of the orifice track changes throughout a length of the orifice track.

7. The powertrain mount of claim 6 further comprising a motor engaged with the track member and adapted to rotate the track member.

8. The powertrain mount of claim 6 further comprising an encoder and a motor, the motor being engaged with the track member and adapted to rotate the track member.

9. The powertrain mount of claim 6 wherein the outer surface of the track member is generally circular.

10. The powertrain mount of claim 6 wherein the containment plate retains the track member against the orifice plate.

11. The powertrain mount of claim 6 wherein the base plate is metal.

12. The powertrain mount of claim 6 wherein the molded member comprises an elastomer.

13. The powertrain mount of claim 6 wherein the base plate and the molded member define a cavity.

14. The powertrain mount of claim 13 further comprising a diaphragm extending across the cavity.

15. The powertrain mount of claim 6 wherein the exit faces the base plate.

16. The powertrain mount of claim 6 wherein the entrance faces the molded member.

17. An engine mount comprising:

a base plate connected to a molded member;

an orifice plate connected to one of the base plate or the molded member, the orifice plate having an exit, a first surface sloping toward the exit, and an inner surface;

a track member having an outer surface proximate the first surface of the orifice plate the outer surface of the track member having an entrance;

a containment plate retaining the track member against the orifice plate, the containment plate forming an orifice track with die first and inner surfaces of the orifice plate and with the outer surface of the track member; wherein a cross-sectional area of the orifice track changes throughout a length of the orifice track; and a motor engaged with the track member and adapted to rotate the track member.

18. The engine mount of claim 17 wherein the outer surface of the track member is generally circular.

19. The engine mount of claim 17 wherein the base plate and the molded member define a cavity, and further comprising a diaphragm extending across the cavity.

20. The engine mount of claim 17 wherein the exit faces the base plate, and the entrance faces the molded member.

* * * * *